May 9, 1933.  H. M. ALLAIN  1,908,005
CUTTING MECHANISM FOR THREAD SPOOLS
Filed June 16, 1931  2 Sheets-Sheet 1
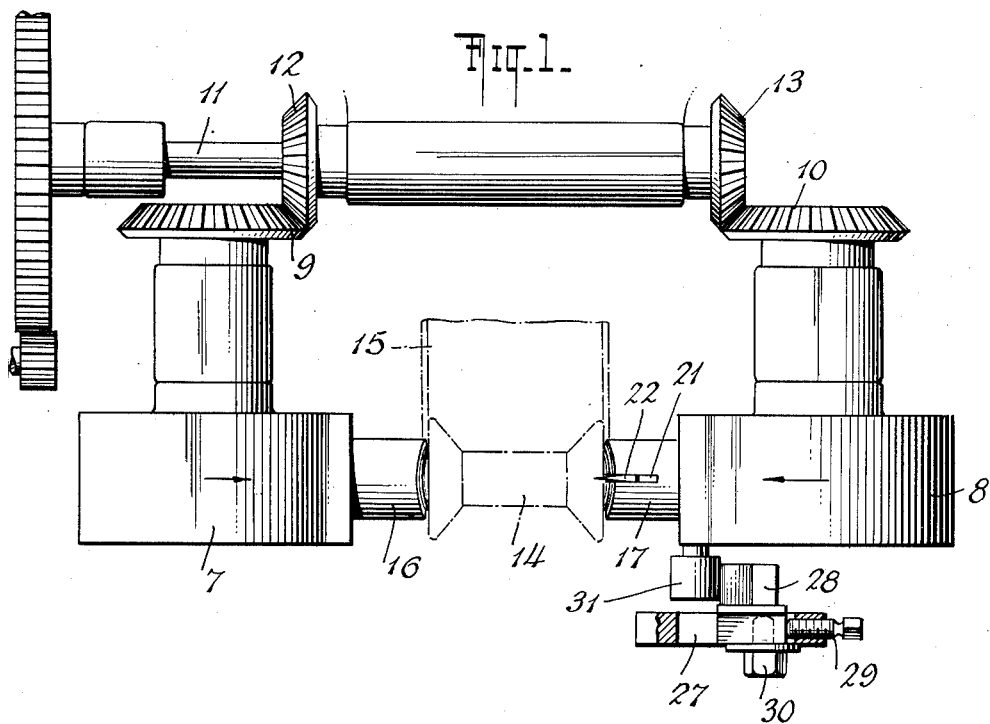
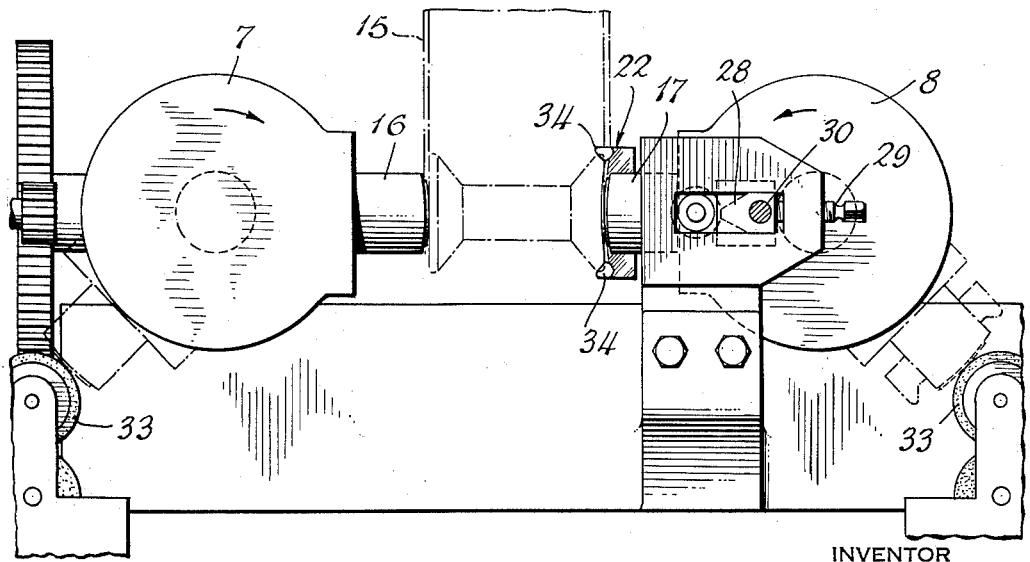
INVENTOR
HENRY M. ALLAIN
BY
ATTORNEYS May 9, 1933.  H. M. ALLAIN  1,908,005
CUTTING MECHANISM FOR THREAD SPOOLS
Filed June 16, 1931  2 Sheets-Sheet 2
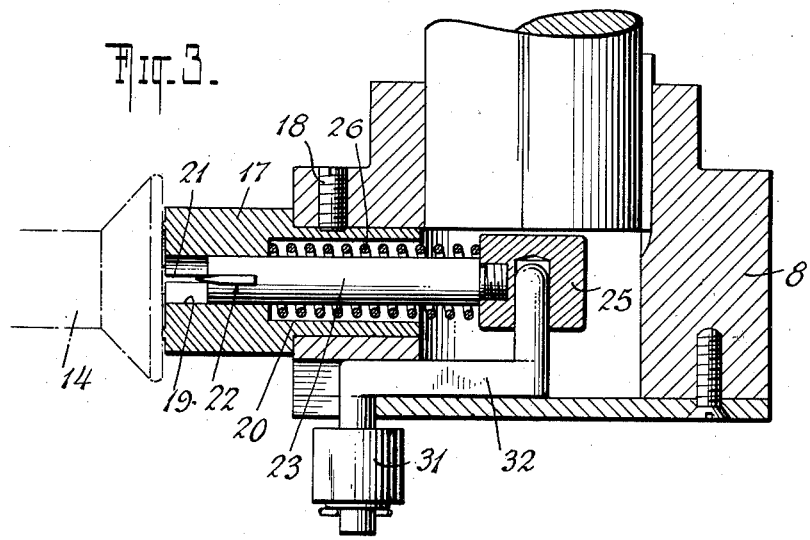
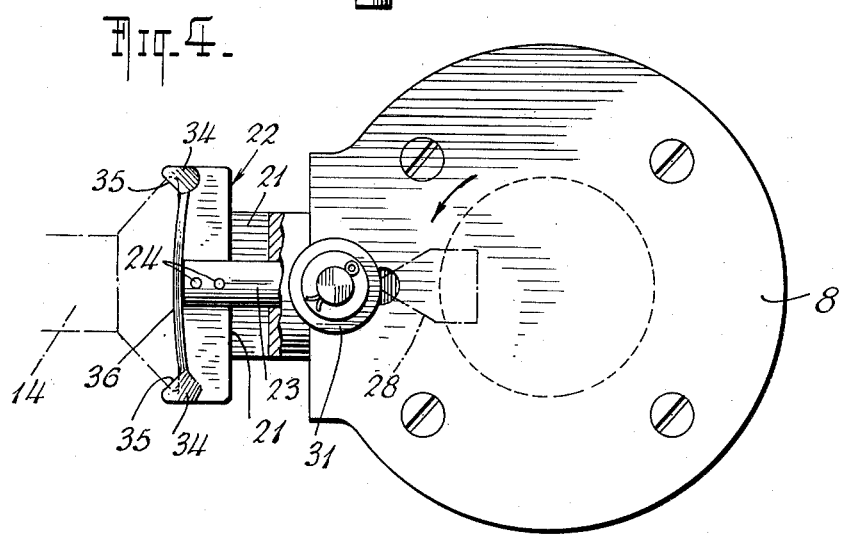
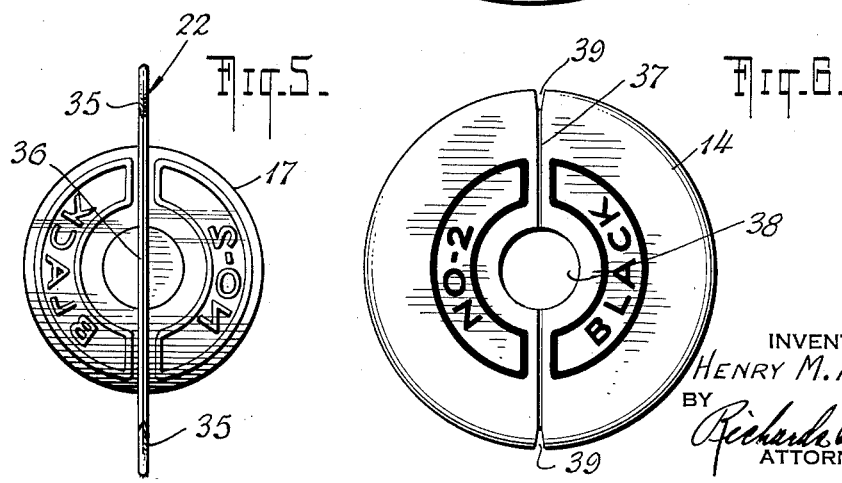
INVENTOR
HENRY M. ALLAIN
BY
ATTORNEYS Patented May 9, 1933

1,908,005

UNITED STATES PATENT OFFICE

HENRY M. ALLAIN, OF ACUSHNET, MASSACHUSETTS, ASSIGNOR, BY MESNE ASSIGN-
MENTS, TO A. H. RICE COMPANY, A CORPORATION OF MASSACHUSETTS

CUTTING MECHANISM FOR THREAD SPOOLS

Application filed June 16, 1931. Serial No. 544,854.

This invention relates to improvements in the manufacture of spools for thread and has particular reference to a mechanism for cutting the end of a spool to form a thread-receiving groove therein.

By the use of the present mechanism there is formed in one end of a spool a thread-receiving channel or groove which intersects the coaxial opening of the spool and which joins notches formed in the periphery of said end. Said notches and groove are adapted to receive the loose end of a thread wound upon the spool and when positioned therein the thread is held in countersunk relation to the surface of the end of the spool and a portion thereof extends across said axial opening where it can be readily grasped and then disengaged from the groove and notches.

In accordance with the present invention, it is proposed to provide a cutting device adapted for attachment to an operating member which engages an end of a spool, the cutter being actuated upon each engagement of said member with successive spools to form in each of them the aforesaid groove and notches.

The inventive idea involved is capable of receiving a variety of mechanical expressions, one of which, for purposes of illustration, is shown in the accompanying drawings, wherein—

Figure 1 is a fragmentary plan view of a mechanism for carrying out the invention;

Figure 2 is a view in front elevation of said mechanism;

Figure 3 is a horizontal section illustrating the cutting device and operating mechanism therefor;

Figure 4 is a front elevation, partly broken away and shown in section, of the mechanism shown in Figure 3;

Figure 5 is an end elevation of the cutting device and its support; and

Figure 6 is an end view of a spool which has been cut by the mechanism of the present invention.

As is well known, spools upon which thread is wound are printed with suitable indicia at both ends thereof and, for this purpose, there is employed a printing mechanism consisting of two dies which cooperate to simultaneously engage the opposite ends of a spool so as to impress the printed matter thereon. The present invention proposes the utilization of such a printing mechanism for cutting a groove and notches in one end of the spool and, in so doing, accomplishes the dual function of printing and cutting at the same time.

The invention is illustrated as applied to such a printing mechanism and only so much of the latter is shown as is necessary to a complete understanding of the present mechanism. Thus, in known machines, there is usually provided two rotating heads 7 and 8 disposed in opposed relation and driven in opposite directions by gears 9 and 10, respectively, which are operated from a common drive shaft 11 having the gears 12 and 13 thereon. The spools 14 to be printed are fed down an inclined chute 15 to a position between the two heads 7 and 8 where a spool is engaged, upon each successive revolution of said heads, by the printing dies 16 and 17 which impress the printing indicia upon the respective ends of the spool, following which said dies are disengaged from the spool by continued rotation of the heads and the spool is then dropped from the machine.

The printing die 16 is of the usual construction employed in printing mechanism of this character, but the die 17 is modified to adapt the present cutting mechanism thereto. As shown in Figure 3, the die 17, which is detachably secured in the head 8 by means of a screw 18, is provided with a longitudinal opening 19, the inner end of which is enlarged as indicated at 20, and in the outer end of said die the same is provided with slots 21 diametrically disposed on opposite sides of the opening 19 and in which is movable the cutter generally indicated by the numeral 22 which is of a length greater than the diameter of the die, so that the ends of said cutter extend outwardly beyond said die. The cutter 22 is carried in the outer end of a plunger 23 and detachably secured therein by means of dowel pins or like fasteners 24. The inner end of the plunger 23 is connected to a head 25 and interposed between the latter and the forward end of the enlarged portion 20 of the opening 19 is an expansion spring 26 coiled about the plunger and operable to maintain the same in a normally retracted position relative to the outer end of the die. The plunger 23 is operated to project the cutter 22 into engagement with the end of the spool 14 as the die 17 comes in contact therewith. For this purpose, there is mounted upon the frame 27 of the printing mechanism a cam member 28 adjustable back and forth along said frame by means of an adjusting screw 29 and secured in its adjusted positions by the set-screw 30. The cam 28 is suitably positioned in the path of movement of a cam roller 31 carried by the rotating head 8 and joined to the head 25 by an angular arm 32 which is slidable back and forth in said head 8 under the influence of the spring 26 and the cam 28. Thus, as the roller 31 engages the inclined surface of said cam, when traveling in the direction of the arrow indicated in Figure 4, the arm 32 moves outwardly and forces the plunger 23 in the same direction against the tension of the spring 26, thus causing the cutter 22 to be projected beyond the end of the die 17 and into engagement with the end of the spool 14 to perform the cutting operation. As the roller 31 passes over the high point of the cam 28, the plunger 23 is again caused to recede into the head 8 by the action of the spring 26, thus again retracting the cutter. Upon each revolution of the heads 7 and 8, the faces of the respective dies 16 and 17 wipe over inking rollers 33, as indicated in dotted lines in Figure 2.

Although the mechanism shown is one in which the printing and cutting operations upon the spool are performed simultaneously, it will be understood that the invention is not to be construed as limited to such action, nor that printing dies need be employed to carry the cutter. If it is not desired to print the ends of the spool at the time of the cutting operation, said dies may be replaced by heads of any character one of which serves as an abutment for one end of the spool, while the other has the cutter thereon.

As shown, the cutter 22 comprises a substantially flat blade, the ends of which are enlarged or widened to form end sections 34 which are tapered outwardly, and the inner edges of said sections, together with the adjacent edge of the blade proper, are sharpened to form the end and intermediate cutting edges 35 and 36, respectively. The length of the edge 36 is slightly less than the diameter of the end of the spool 14 and the edges 35 extend diagonally from and form a continuation of the edge 36. It will thus be apparent that, when the edges are brought into contact with the end of a spool, a groove 37 (Figure 6) will be cut, by the edge 36, diametrically across the face of said end in intersecting relation to the axial opening 38 of the spool and, through the cooperation of the cutting edges 35 with said edge 36, notches 39 will be formed in the periphery of said end which join the ends of said groove. Thus formed, the groove and notches are adapted to receive the loose end of a thread subsequently wound upon the spool and said loose end will be frictionally held in the notches and countersunk in the groove until withdrawn by grasping and pulling that portion of the thread which extends across the opening 38 of the spool.

By having the cutting edges 35 of sufficient length and diverging outwardly from the blade, spools which have only slight variations in diameter may be cut by the same blade, but, should it be desired to cut considerably larger spools, it is only necessary to replace the present cutter with one of greater length.

What is claimed is:

1. In combination, spool-engaging members for contacting opposite ends of a spool, a cutter carried by and movable relative to one of said members to cut a groove across one end of said spool, and means to move said cutter.

2. In combination, spool-engaging members for contacting opposite ends of a spool, a cutter mounted for reciprocation in one of said members and movable into contact with said spool to cut a groove in one end thereof, and means to reciprocate said cutter.

3. In combination, spool-engaging members for contacting opposite ends of a spool, a cutter mounted for reciprocation in one of said members and movable into contact with said spool to cut a groove in one end thereof, and a cam-operated member for engaging said cutter with said spool.

4. In combination, spool engaging members for contacting opposite ends of a spool, means movable relative to one of said members for cutting a groove across one end of said spool and also for forming notches in the periphery thereof adjoining the ends of said groove, and means to move the first named means.

5. In combination, spool engaging members for contacting opposite ends of a spool, a cutter mounted for reciprocation in one of said members and operable to form a groove in one end of said spool and simultaneously cut a notch in the spool at each end of said groove, and means to reciprocate said cutter.

In testimony whereof, I have affixed my signature.

HENRY M. ALLAIN.